United States Patent
Zheng et al.

(10) Patent No.: US 9,444,122 B2
(45) Date of Patent: Sep. 13, 2016

(54) BATTERY MODULE, BATTERY TEMPERATURE MANAGING SYSTEM AND VEHICLE COMPRISING THE SAME

(71) Applicants:Shenzhen BYD Auto R&D Company Limited, Shenzhen, Guangdong (CN); BYD Company Limited, Shenzhen, Guangdong (CN)

(72) Inventors: Weixin Zheng, Shenzhen (CN); Yuanyuan He, Shenzhen (CN); Yi Zeng, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 462 days.

(21) Appl. No.: 13/900,313

(22) Filed: May 22, 2013

(65) Prior Publication Data

US 2013/0280564 A1  Oct. 24, 2013

(30) Foreign Application Priority Data

Dec. 29, 2010 (CN) ...................... 2010 2 0691717 U
Dec. 31, 2010 (CN) ...................... 2010 2 0697948 U
Dec. 28, 2011 (WO) ................. PCT/CN2011/084859

(51) Int. Cl.
*H01M 2/00* (2006.01)
*H01M 10/663* (2014.01)
*B60L 11/18* (2006.01)
(Continued)

(52) U.S. Cl.
CPC ...... *H01M 10/5095* (2013.01); *B60L 11/1874* (2013.01); *B60L 11/1879* (2013.01); *H01M 10/61* (2015.04); *H01M 10/625* (2015.04); *H01M 10/63* (2015.04); *H01M 10/657* (2015.04); *H01M 10/6556* (2015.04); *H01M 10/6557* (2015.04); *H01M 10/6568* (2015.04); *H01M 10/663* (2015.04); *B60L 2240/545* (2013.01); *H01M 10/486* (2013.01); *H01M 10/647* (2015.04); *Y02T 10/705* (2013.01); *Y02T 10/7005* (2013.01); *Y02T 90/16* (2013.01)

(58) Field of Classification Search
CPC ............ Y02T 10/7005; Y02T 10/705; B60L 11/1879; B60L 2240/545; H01M 10/5095; H01M 10/625; H01M 10/633; H01M 10/647; H01M 10/6556; H01M 10/6568
See application file for complete search history.

(56) References Cited

U.S. PATENT DOCUMENTS

| 5,824,432 A * | 10/1998 | Currle ................. B60L 11/1874 429/112 |
| 2002/0184908 A1 | 12/2002 | Brotz et al. |
| 2006/0060340 A1* | 3/2006 | Busse ................ B60H 1/00278 165/202 |

(Continued)

FOREIGN PATENT DOCUMENTS

| CN | 1552108 A | 12/2004 |
| CN | 1753205 A | 3/2006 |

(Continued)

*Primary Examiner* — Cynthia H Kelly
*Assistant Examiner* — Monique Wills
(74) *Attorney, Agent, or Firm* — Brinks Gilson & Lione

(57) ABSTRACT

A battery module and a battery temperature managing system of a battery temperature managing system includes a battery module; a heat exchanger connected with the battery module via a coolant circulating circuit, and a temperature control device connected with the heat exchanger via a refrigerant circulating circuit, in which a coolant in the coolant circulating circuit and a refrigerant in the refrigerant circulating circuit exchange heat with each other via the heat exchanger, and the battery module is cooled or heated by the coolant when the coolant flows through the battery module.

8 Claims, 6 Drawing Sheets

(51) Int. Cl.
*H01M 10/625* (2014.01)
*H01M 10/6556* (2014.01)
*H01M 10/6568* (2014.01)
*H01M 10/6557* (2014.01)
*H01M 10/63* (2014.01)
*H01M 10/657* (2014.01)
*H01M 10/61* (2014.01)
*H01M 10/647* (2014.01)
*H01M 10/48* (2006.01)

(56) References Cited

U.S. PATENT DOCUMENTS

| | | |
|---|---|---|
| 2007/0202792 A1 | 8/2007 | Shimizu et al. |
| 2009/0249802 A1 | 10/2009 | Nemesh et al. |
| 2009/0249807 A1 | 10/2009 | Nemesh et al. |
| 2009/0253026 A1 | 10/2009 | Gaben |
| 2011/0293974 A1* | 12/2011 | Yoon .................. H01M 2/1083 429/72 |
| 2013/0244077 A1* | 9/2013 | Palanchon ................ F28F 3/12 429/120 |

FOREIGN PATENT DOCUMENTS

| | | |
|---|---|---|
| CN | 1855598 A | 11/2006 |
| CN | 1905268 A | 1/2007 |
| CN | 101551174 A | 10/2009 |
| CN | 101551175 A | 10/2009 |
| CN | 201570556 U | 9/2010 |
| CN | 201936970 U | 8/2011 |
| CN | 202076386 U | 12/2011 |
| DE | 195 03 085 A1 | 9/1996 |
| EP | 1 637 709 A2 | 3/2006 |
| JP | 2002-352866 A | 12/2002 |
| JP | 2006059573 A | 3/2006 |
| JP | 2006-296193 A | 10/2006 |
| JP | 2006296193 A | 10/2006 |
| JP | 2008-513949 A | 5/2008 |
| WO | WO 2007046588 A1 | 4/2007 |
| WO | WO 2008/099609 A1 | 8/2008 |

* cited by examiner

BATTERY MODULE, BATTERY TEMPERATURE MANAGING SYSTEM AND VEHICLE COMPRISING THE SAME

CROSS-REFERENCE TO RELATED APPLICATIONS

This application claims the priority to and benefit of the following applications:
1) International Patent Application No. PCT/CN2011/084859 filed Dec. 28, 2011.
2) Chinese Patent Application No. 2010-20691717.2 filed with the State Intellectual Property Office of the People's Republic of China (SIPO) on Dec. 29, 2010; and
3) Chinese Patent Application No. 2010-20697948.4 filed with the State Intellectual Property Office of the People's Republic of China (SIPO) on Dec. 31, 2010.

The above patent applications are incorporated herein by reference in their entirety.

FIELD OF THE INVENTION

The present disclosure relates to the field of power battery, more particularly to a battery module, a battery temperature managing system, and a vehicle comprising the same.

BACKGROUND

The statements in this section provide background information related to the present disclosure and do not constitute prior art.

With the exhaustion of the global energy resources and the growing emphasis on environmental protection, electrical vehicles (EV) and hybrid electrical vehicles (HEV) have drawn much attention due to the advantages such as low exhaust emissions and low energy consumption etc. In recent years, more and more companies and research institutes have successively invested in the researching as well as marketing in EV and HEV. It has been found that during the researching of electrical vehicles and hybrid electrical vehicles, the power battery technology is one of the key elements that may restrict the development of the new energy vehicles.

In EV, HEV or similar vehicles, a lithium ion battery with high power may normally be used as a power battery to satisfy high output requirements. As the power battery in the vehicle has a higher discharging rate, the lithium ion battery may produce a large amount of heat in the rapid discharging process. When the temperature is increased, the lithium ion battery may run in a severely uneven state, thus directly affecting the battery life span and producing serious potential safety hazard. Therefore, to ensure that the lithium ion battery runs in a favorable temperature condition, excellent heat dissipation for the lithium ion battery is needed.

Moreover, because, as an energy storage device, the power battery plays a critical role in EV, HEV or similar vehicles, the performance of the power battery greatly affects the performance of the whole vehicle. The power battery is normally formed by a plurality of single cells connected in serials, in parallel, or in serials and parallel. Currently, single cells may not work normally at low temperature, e.g., a temperature lower than −20° C. or high temperature e.g., a temperature higher than 45° C., and thus the vehicle using the power battery may not work normally.

SUMMARY

In viewing thereof, embodiments of the present disclosure are directed to solve at least one of the problems existing in the prior art. Therefore, a battery temperature managing system may need to be provided, which may cool or heat a battery module uniformly to ensure that the battery module works normally. Further, a battery module may also need to be provided, which may be cooled or heated uniformly and have temperature consistency therein. Furthermore, a vehicle comprising the same may need to be provided.

According to an aspect of the present disclosure, a battery temperature managing system may be provided. The battery temperature managing system may include: a battery module; a heat exchanger connected to the battery module via a coolant circulating circuit; and a temperature control device connected to the heat exchanger via a refrigerant circulating circuit, in which a coolant in the coolant circulating circuit and a refrigerant in the refrigerant circulating circuit exchange heat with each other via the heat exchanger, and the battery module is cooled or heated by the coolant when the coolant flows through the battery module.

With the battery temperature managing system according to an embodiment of the present disclosure, the coolant rather than the air is used as a medium for cooling or heating the battery module, thus the battery module is cooled or heated more effectively. Moreover, because the coolant may flow circularly, compared with the heat exchange via air, the battery module may be efficiently cooled or heated, so that the battery module may always work in a normal state with a consistent temperature therein.

According to another aspect of the present disclosure, a battery module may be provided. The battery module may comprise: a lower shell body having a cooling plate and a plurality of separator plates provided on the cooling plate at intervals; and an upper cover hermetically connected with tops of the plurality of the separator plates; a front cover plate and a back cover plate hermetically connected with front most sides and backmost sides of the plurality of the separator plates respectively, in which the cooling plate, the upper cover, the front cover plate, the back cover plate and the plurality of separator plates are hermetically connected to form a plurality of separate sealing spaces for receiving battery cores and electrolytes therein respectively, in which main flow channels are formed inside the upper cover and the cooling plate respectively, and branch flow channels are formed inside the separator plates respectively which are in fluid communication with the main flow channels.

With the battery module according to an embodiment of the present disclosure, the cooling plate, the upper cover, the front cover plate, the back cover plate and the plurality of separator plates are hermetically connected to form a plurality of separate sealing spaces for receiving battery cores and electrolytes therein respectively; and main flow channels are formed inside the upper cover and the cooling plate, and branch flow channels are formed inside the separator plates respectively which are in fluid communication with the main flow channels. Therefore, the coolant flowing into the main flow channel may flow into the branch flow channels respectively and then flow into the main flow channel, thus the battery cores and electrolytes in the plurality of separate sealing spaces may be cooled or heated effectively and uniformly. Thus, the temperature consistency inside the battery module may be ensured.

According to yet another aspect of the present disclosure, a vehicle comprising the battery temperature managing system may also be provided.

Additional aspects and advantages of the embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of the disclosure will become apparent and more readily appreciated from the following descriptions taken in conjunction with the drawings in which.

DETAILED DESCRIPTION

Figure 1:
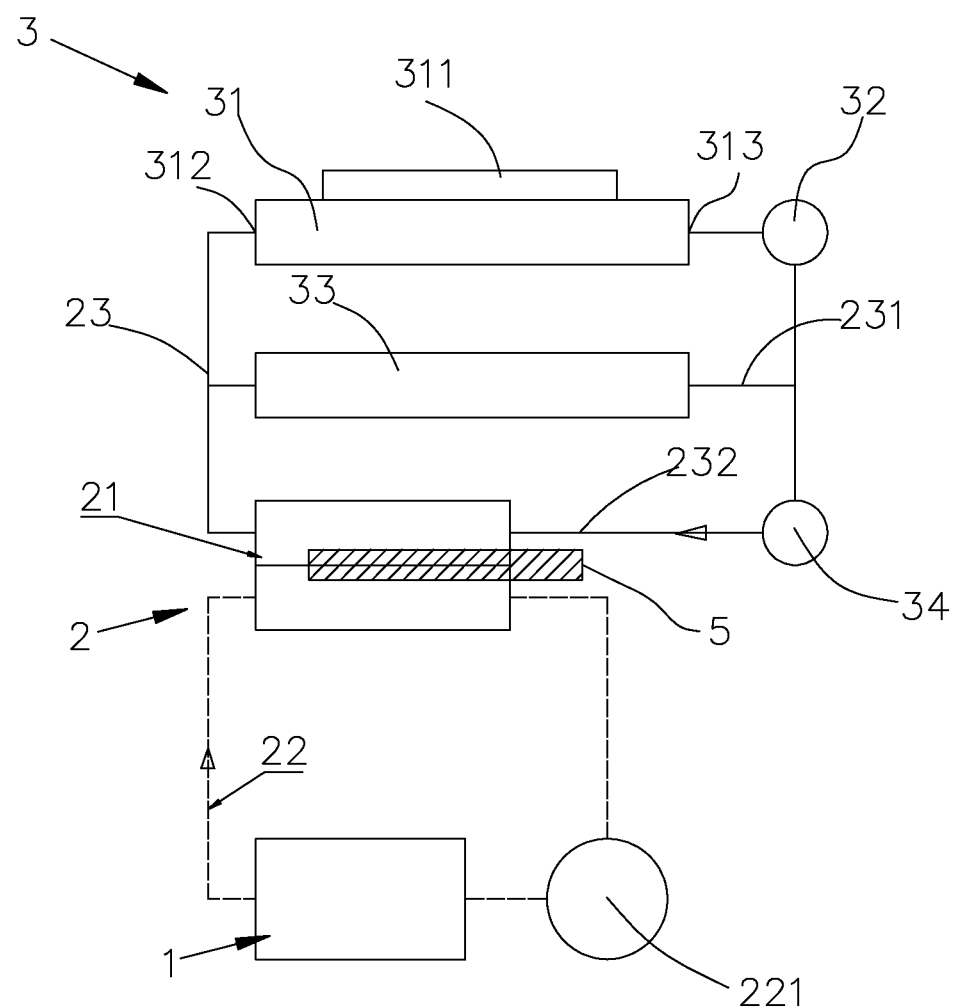
FIG. 1 is a schematic diagram of a battery temperature managing system according to an embodiment of the present disclosure.

It will be appreciated by those of ordinary skill in the art that the disclosure may be embodied in other specific forms without departing from the spirit or essential character thereof. The presently disclosed embodiments are therefore considered in all respects to be illustrative and not restrictive. The same or similar elements and the elements having same or similar functions are denoted by like reference numerals throughout the descriptions.

In the following, a battery temperature managing system according to an embodiment of the present disclosure will be described below with reference to the drawings.

As shown in FIG. 1, the battery temperature managing system according to an embodiment of the present disclosure may include: a battery module 1, a heat exchanger 21 and a temperature control device 3 having cooling function and, optionally, having heating function. In some embodiment, the battery temperature system may be provided in a vehicle (not shown) having both a battery module and an air conditioning system. And alternatively, an air conditioning system of the vehicle may be used as the temperature control device 3.

In one embodiment, the temperature control device 3 having only cooling function is exemplarily illustrated. However, it should be noted that the temperature control device 3 may also be configured with heating function, which may be used for heating the battery module. Further, the temperature control device 3 may be configured with heat and cooling function as condition may require. As shown in FIG. 1, the heat exchanger 21 is connected with the battery module 1 via a coolant circulating circuit 22, and the temperature control device 3 is connected with the heat exchanger 21 via a refrigerant circulating circuit 23. A coolant in the coolant circulating circuit 22 flows through the battery module 1 and the heat exchanger 21, and the battery module 1 is cooled by the coolant when the coolant flows through the battery module 1. A refrigerant in the refrigerant circulating circuit 23 flows through the temperature control device 3 and the heat exchanger 21, and is cooled when flowing through the temperature control device 3. The coolant in the coolant circulating circuit 22 and the refrigerant in the refrigerant circulating circuit 23 exchange heat with each other via the heat exchanger 21. Therefore, after flowing through the battery module 1 and cooling the battery module 1, the coolant flows through the heat exchanger 21 and exchanges heat with the refrigerant via the heat exchanger 21 to become a cooled coolant, and then the cooled coolant flows through the battery module 1 again to repeatedly cool the battery module 1.

In some embodiment, the temperature control device 3 may be a conventional in-vehicle temperature control device having cooling function in the vehicle, thus effectively utilizing in-situ devices in the vehicle. Moreover, an in-vehicle air conditioner has excellent refrigerating effect, thus effectively enhancing the refrigerating efficiency of the power battery. In one embodiment, the temperature control device 3 may be an air conditioning system comprising an evaporator 33, a compressor 32, and a condenser 31 connected with the compressor 32. A condenser fan 311 may be provided on the condenser 31 for accelerating heat dissipation. The condenser 31 has a refrigerant inlet 312 and a refrigerant outlet 313 which are connected with the refrigerant circulating circuit 23 respectively. The refrigerant in the refrigerant circulating circuit 23 flows through the heat exchanger 21 and exchanges heat with the coolant to become a high temperature refrigerant, the high temperature refrigerant flows into the condenser 31 via the refrigerant inlet 312 and becomes a low temperature refrigerant after heat dissipation, and then the low temperature refrigerant flows back into the heat exchanger 21. The compressor 32 is provided in the refrigerant circulating circuit 23 which is in fluid communication with the condenser 31. The compressor 32 is configured to be turned on/off for allowing or preventing the refrigerant to flow through or from flowing through the condenser 31 and the heat exchanger 21. The compressor 32 may be electrically powered, and may allow the refrigerant to flow circularly in addition to adjustment of the flow velocity of the refrigerant when the compressor 32 is turned on. A gaseous refrigerant may be compressed by the compressor 32 to become a liquid refrigerant with high-temperature and high-pressure, and then the liquid refrigerant may flow into the condenser 31 from the compressor 32 to become a liquid refrigerant with normal-temperature and high-pressure after heat dissipation. The members of the temperature control device 3, the arrangements and the function thereof are well known in the art, so detailed descriptions thereof are omitted here for clarity purpose.

A circulating pump 221 may be provided in the coolant circulating circuit 22, which may be turned on/off for allowing or preventing the coolant to flow through or from flowing through the battery module 1 and the heat exchanger 21. The circulating pump 221 may be used for pumping the coolant in the coolant circulating circuit 22 and allowing the coolant to flow through the battery module 1 and the heat exchanger 21 circularly. When the coolant flows into the battery module 1, the coolant may take away the heat produced inside the battery module 1 to become a heated coolant, the heated coolant flows into the heat exchanger 21 and exchanges heat with the refrigerant in the refrigerant circulating circuit 23 to become a cooled coolant, and then the cooled coolant flows back into the battery module 1, thus effectively cooling the battery module 1. The circulating pump 221 may be driven by electric power and may adjust the flow velocity of the coolant when the circulating pump 221 is turned on.

Figure 2:
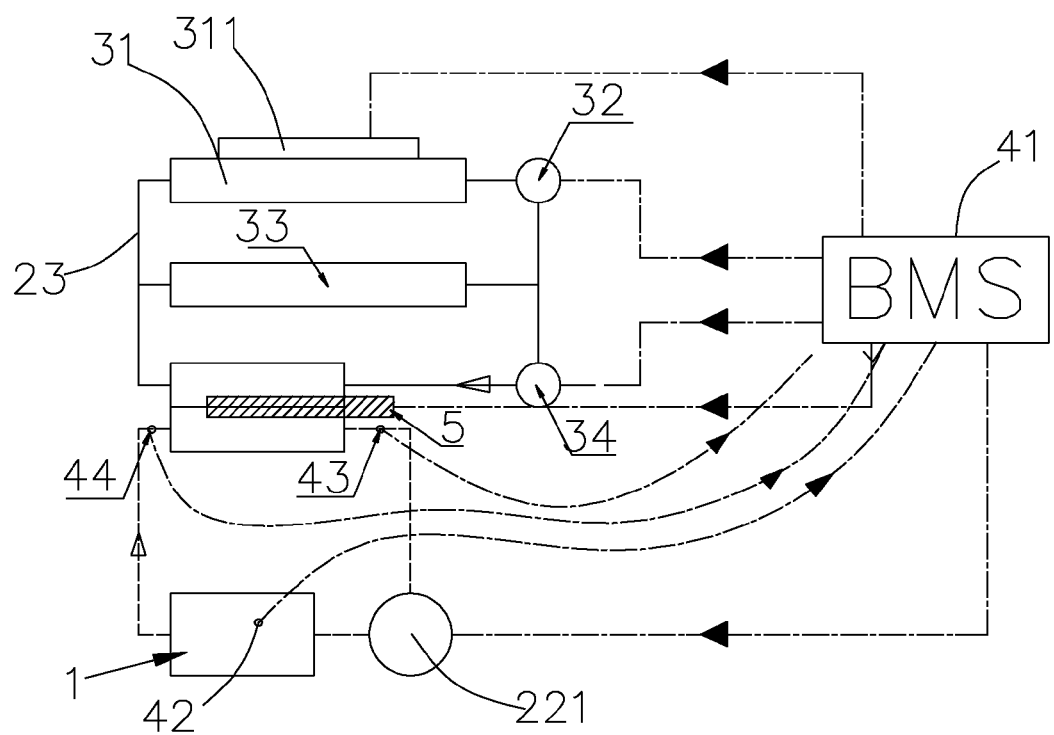
FIG. 2 is a control principle diagram of a battery temperature managing system according to an embodiment of the present disclosure.

In one embodiment, as shown in FIG. 2, the battery temperature managing system further includes a control unit 41 to turn on/off the compressor 32 and the circulating pump 221 based on a temperature signal from the battery module 1. In one embodiment, the control unit 41 is further configured to turn on/off the condenser fan 311.

The refrigerant circulating circuit 23 may include a first branch 231, or an evaporator branch, and a second branch 232. The evaporator 33 is disposed in the first branch 231 for cooling a cabin of the vehicle, and the heat exchanger 21 is disposed in the second branch 232 for exchanging heat between the refrigerant and the coolant. The first branch 231 may be further provided with an evaporator controller (not shown) for controlling the flow of the refrigerant through the evaporator 31. And the refrigerant circulating circuit 23 is further provided with an electromagnetic valve 34 to control the flow of the refrigerant through the heat exchanger 21, and the control unit 41 may be configured to control the evaporator controller and the electromagnetic valve 34 to switch on/off.

In one embodiment, the control unit 41 includes: a first temperature sensor 43 disposed at a coolant input of the battery module 1 for providing an input coolant temperature signal to the control unit 41; and a second temperature sensor 44 disposed at a coolant output of the battery module 1 for providing an output coolant temperature signal to the control unit 41. The control unit 41 may be implemented as a conventional battery management system (BMS) in an EV or HEV for monitoring the state of the battery module 1. The control unit 41 may be electrically connected with the circulating pump 221, the compressor 23, the electromagnetic valve 34 and the condenser fan 311 respectively. When the temperature of the battery module 1 is greater than a first predetermined value, the control unit 41 outputs a command to turn on the circulating pump 221 and the temperature control device 3.

The electromagnetic valve 34 may be disposed in the second branch 232 for allowing the refrigerant to flow through the heat exchanger 21 or preventing the refrigerant from flowing through the heat exchanger 21. When the battery module 1 does not need to be cooled, the electromagnetic valve 34 is switched off. The evaporator controller may be disposed in the first branch 231 for allowing the refrigerant to flow through the evaporator 31 or preventing the refrigerant from flowing through the evaporator 31. When the cabin of the vehicle does not need to be cooled, the evaporator controller is switched off.

In one embodiment, the heat exchanger 21 is a refrigerant-coolant heat exchanger for exchanging heat between the refrigerant and the coolant so as to cool or heat the battery module 1. In one embodiment, as shown in the FIG. 1, the coolant circulating circuit 22 is shown by a dashed line, the refrigerant circulating circuit 23 is shown by a solid line, and the flowing directions of the coolant and the refrigerant are shown by arrows. It should be noted that there are no special limitations on the flowing directions of the coolant and the refrigerant, provided that the coolant and the refrigerant flow circularly. The coolant circulating circuit 22 and the refrigerant circulating circuit 23 are separately disposed but are not communicated with each other, and the coolant circulating circuit 22 and the refrigerant circulating circuit 23 exchange heat with each other via the heat exchanger 21. The coolant circulating circuit 22 is connected with the heat exchanger 21 for providing the coolant flowing through the heat exchanger 21 and guiding the coolant in flowing through the battery module 1. The second branch 232 of the refrigerant circulating circuit 23 is connected with the heat exchanger 21 for providing the refrigerant flowing through the heat exchanger 21 and guiding the refrigerant in flowing through the condenser 31.

The heat exchanger 21 may be a heat exchanger having heat exchange function well known to those skilled in the art. The coolant may be a conventional coolant, for example, water, ethylene glycol, or a combination thereof, or may be a special coolant containing a particular inhibitor. It should be noted that the coolant may be any liquid coolant having suitable heat transferability. The refrigerant may be any conventional refrigerant used in the air conditioning system of the vehicle, for example, Freon.

In order to avoid the fact that the EV or HEV does not work because the battery module 1 does not work normally at an extreme low temperature, e.g., a temperature lower than −20° C., a heating device may be needed for heating the battery module 1. In one embodiment, the temperature control device 3 has only cooling function, the battery temperature managing system may further include a heating device 5 disposed in the heat exchanger 21, the coolant in the coolant circulating circuit 22 flows through the heating device 5 to be heated, and the control unit 41 is electrically connected with the heating device 5 for controlling the heating device 5 to turn on/off. The heating device 5 may include a heating wire or a positive temperature coefficient (PTC) heating plate.

In some embodiment, the battery module 1 may be any power battery module having cooling channels for driving the EV or HEV vehicle.

Particularly, the battery module 1 may store enough energy for driving the vehicle by electric power.

In one embodiment, as shown in FIGS. 3-6, the battery module 1 includes: a lower shell body 11 having a cooling plate 110 and a plurality of separator plates 111 provided on the cooling plate 110 at intervals; and an upper cover 12 hermetically connected with tops of the plurality of the separator plates 111; a front cover plate 13 and a back cover plate 14 hermetically connected with front most sides and backmost sides of the plurality of the separator plates 111 respectively, in which the cooling plate 110, the upper cover 12, the front cover plate 13, the back cover plate 14 and the plurality of separator plates 111 are hermetically connected to form a plurality of separate sealing spaces 113 for receiving battery cores and electrolytes (not shown) therein respectively, in which main flow channels 1101, 121 are formed inside the upper cover 12 and the cooling plate 110, and branch flow channels 1111 are formed inside the separator plates 111 respectively which are in fluid communication with the main flow channels 1101, 121. Therefore, the coolant flowing into the main flow channel 121 may flow into the branch flow channels 1111 respectively and then flow into the main flow channel 1101, thus cooling or heating the battery cores and electrolytes in the plurality of separate sealing spaces 113 effectively and uniformly. Thus, the temperature consistency of the battery module 1 may be ensured.

Figure 4:
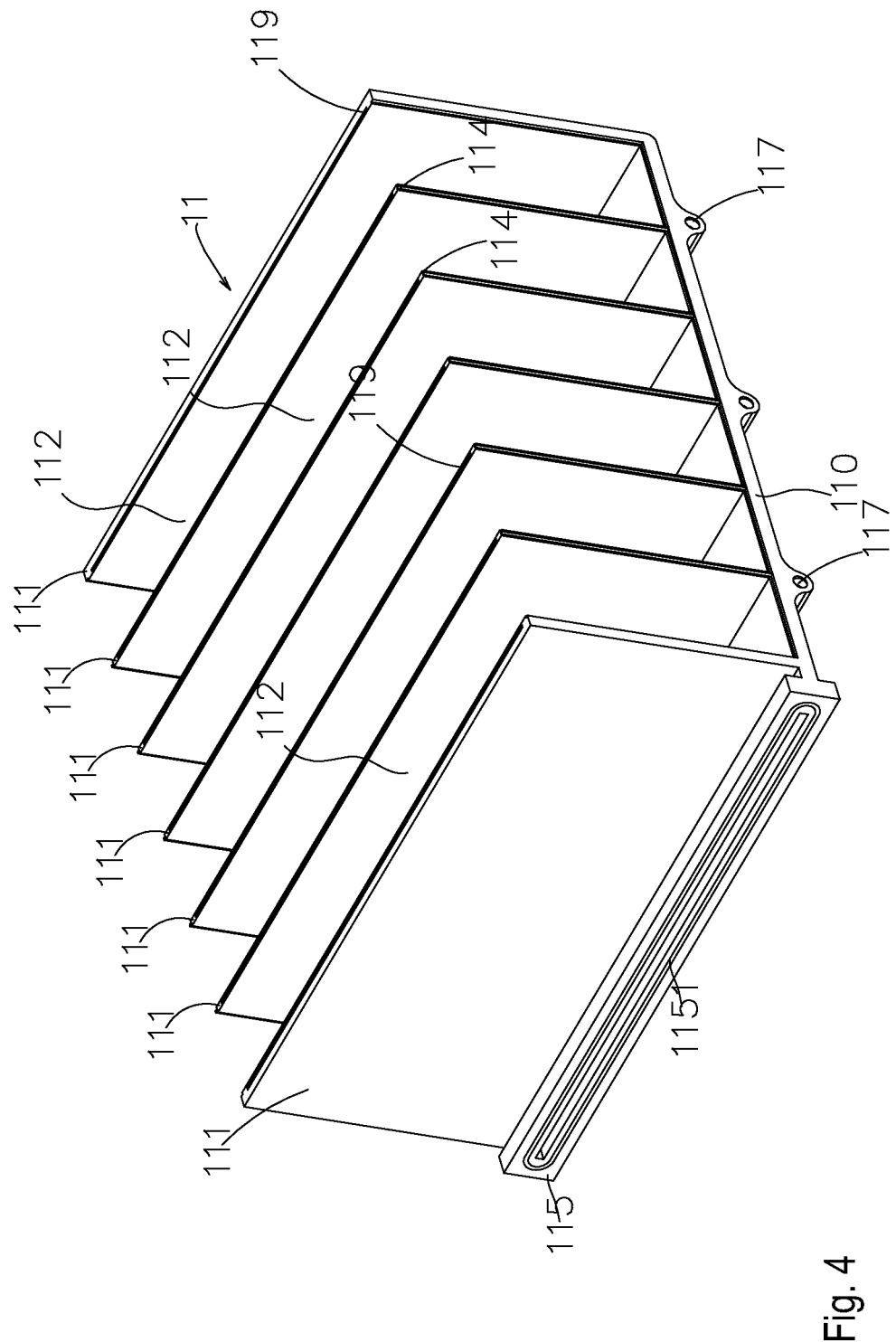
FIG. 4 is a perspective view of a lower shell body in a battery module according to an embodiment of the present disclosure.

As shown in FIG. 4, the lower shell body 11 includes the cooling plate 110 and a plurality of separator plates 111 provided on the cooling plate 110 at intervals; a space 112 is formed between two adjacent separator plates 111; and the cooling plate 110, the upper cover 12, the front cover plate 13, the back cover plate 14 and the plurality of separator plates 111 are hermetically connected to form a plurality of separate sealing spaces 113. As shown in FIG. 4, the separator plates 111 may be perpendicularly provided on the cooling plate 110 for easy assembly. In one embodiment, the cooling plate 110 and the plurality of separator plates 111 are integrally formed, thus facilitating the machining and the assembling of the cooling plate 110, the plurality of separator plates 111, etc. In another embodiment, the plurality of separator plates 111 may be formed separately.

In one embodiment, the plurality of separator plates 111 includes: a first outer plate 111 and a second outer plate 111 provided at the outmost sides of the cooling plate 110; and at least an intermediate plate 111 between the first and second outer plates 111, in which the outer plates 111 have a thickness larger than that of the intermediate plate 111. Therefore, the entire strength of the battery module 1 may be enhanced. As shown in FIG. 4, in one embodiment, the cooling plate 110 includes seven separator plates 111 forming six spaces 112, the six spaces 112 may be sealed to form six separate sealing spaces 113 accordingly, and two outer separator plates 111 are thicker than five intermediate plates 111.

The upper cover 12 is hermetically connected with tops of the plurality of the separator plates 111. To ensure reliable connection between the upper cover 12 and the plurality of the separator plates 111, in one embodiment, as shown in FIG. 4, grooves 119 are formed in the separator plates 111, and the upper cover 12 is formed with projections (not shown) to be mated with the grooves 119. By the connection of the grooves 119 with the projections between the upper cover 12 and the plurality of the separator plates 111, the upper cover 12 and the plurality of the separator plates 111 may be stably connected. In another embodiment, as shown in FIG. 5, the upper cover 12 may be formed with grooves 123, and the separator plates 111 may be formed with projections (not shown) to be mated with the grooves 123, so that the upper cover 12 and the plurality of the separator plates 111 may be stably connected.

Figure 5:
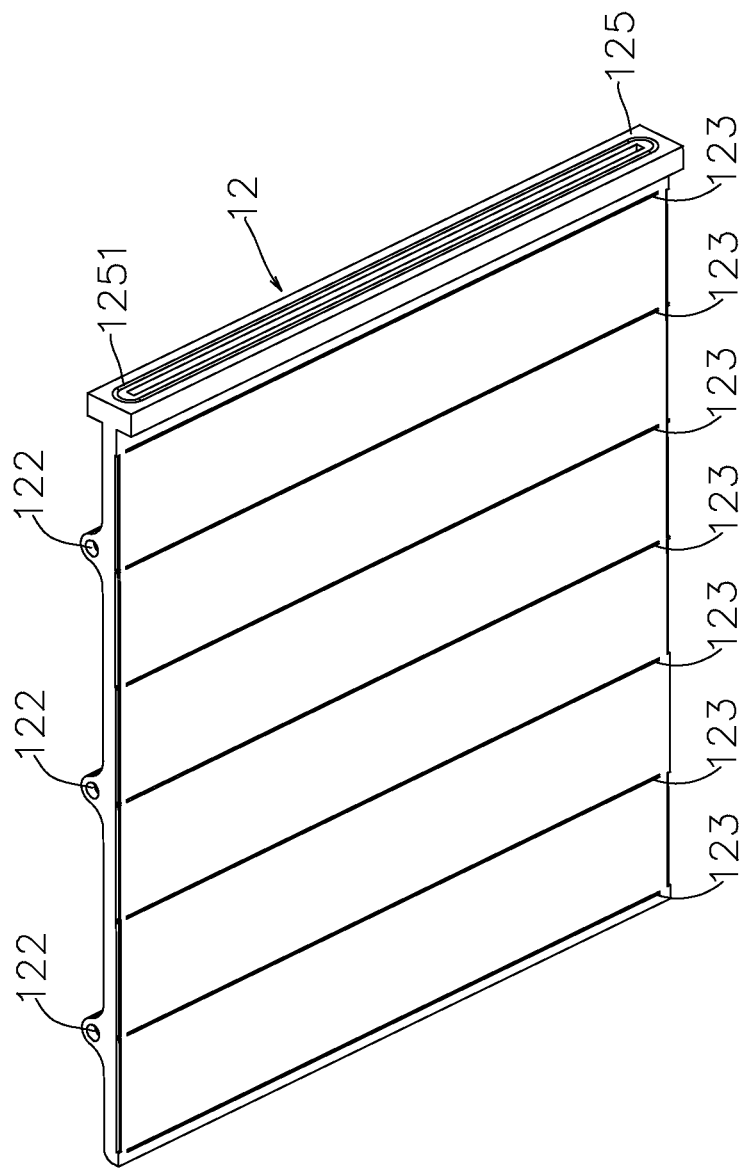
FIG. 5 is a perspective view of an upper cover in a battery module according to an embodiment of the present disclosure.
Figure 6:
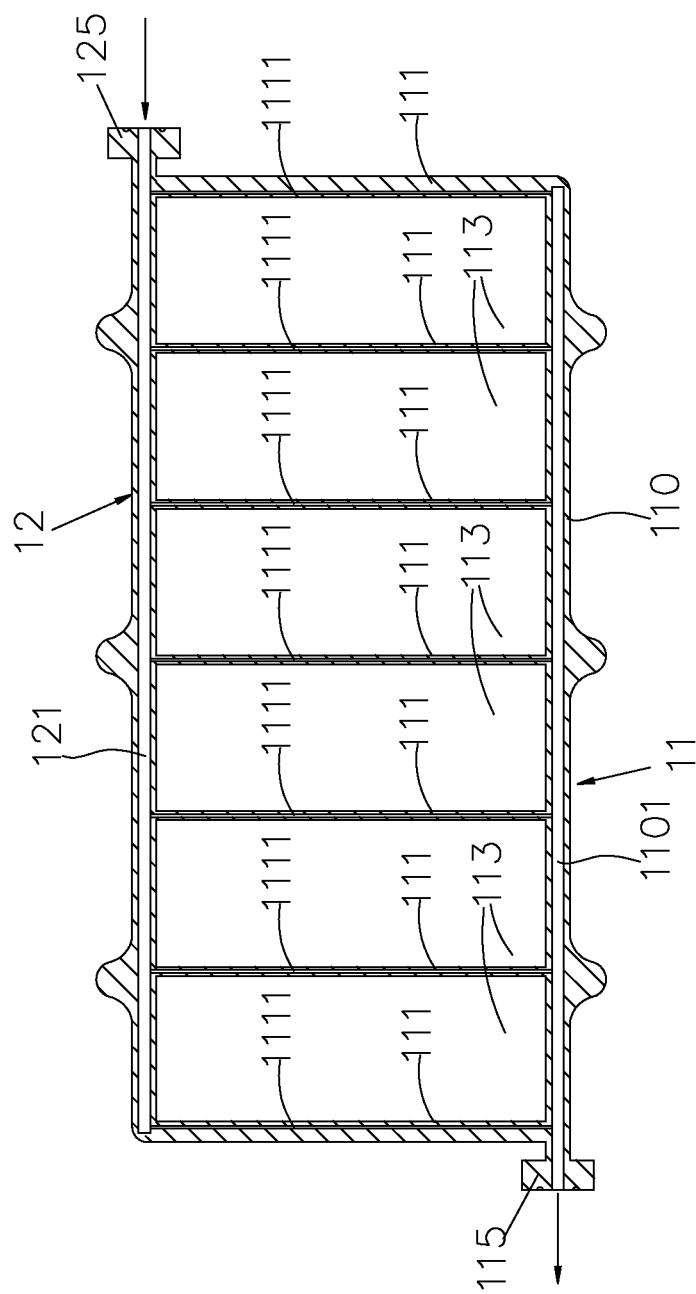
FIG. 6 is a cross-sectional view of a battery module according to an embodiment of the present disclosure.

As shown in FIGS. 4-6, in one embodiment, the cooling plate 110 includes a main outlet channel 1101 with a coolant outlet 115 formed at an end of the main outlet channel 1101, the upper cover 12 includes a main inlet channel 121 and a coolant inlet 125 at a side of the main inlet channel 121 facing away from the end of the coolant outlet 115, each separator plate 111 includes a branch flow channel 1111 connected with the main inlet channel 121 and the main outlet channel 1101, and the coolant inlet 125 and the coolant outlet 115 are connected with the coolant circulating circuit 22 respectively. Therefore, the circulation of the coolant may be facilitated. In one embodiment, the cross sectional area of the coolant inlet 125 is smaller than that of the coolant outlet 115 by about 10%-20%. When the battery temperature managing system includes a plurality of battery modules 1, adjacent battery modules 1 may be connected by welding the coolant inlets 125 of a succeeding battery module with the coolant outlet 115 of a preceding battery module. Because the cross sectional area of the coolant inlet 125 is smaller than that of the coolant outlet 115, the welding of the coolant inlets 125 and the coolant outlets 115 may be easier. In another embodiment, the cooling plate 110 may include a main inlet channel 121, the upper cover 12 may include a main outlet channel 1101, and alternatively, the cross sectional area of the coolant outlet 115 may be smaller than that of the coolant inlet 125.

In one embodiment, the coolant inlet 125 and the coolant outlet 115 include ring grooves 1251, 1151 respectively. The ring grooves 1251, 1151 include seal rings for ensuring the hermetical connection between the battery modules 1 when adjacent battery modules 1 are connected with each other. Therefore, the coolant may flow in the battery modules 1 circularly.

Figure 3:
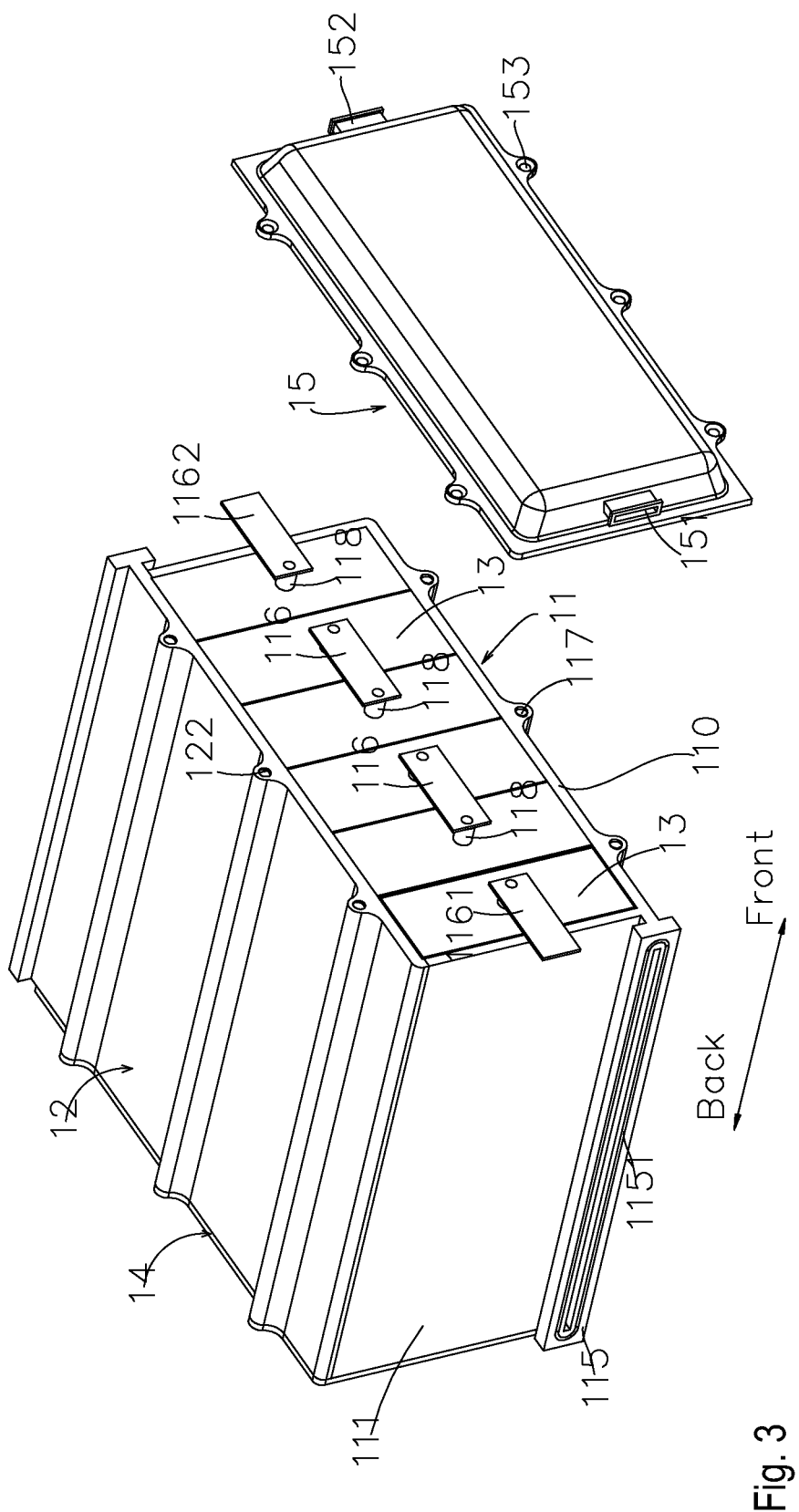
FIG. 3 is a perspective view of a battery module according to an embodiment of the present disclosure.

As shown in FIGS. 3 and 6, in one embodiment, the front cover plate 13 is hermetically connected with front most sides of the plurality of the separator plates 111. The back cover plate 14 is hermetically connected with backmost sides of the plurality of the separator plates 111. The cooling plate 110, the upper cover 12, the front cover plate 13, the back cover plate 14 and the plurality of separator plates 111 are hermetically connected to form a plurality of separate sealing spaces 113 for receiving battery cores and electrolytes therein respectively. Because the battery cores and the electrolytes may be received in the plurality of separate sealing spaces 113, no housings for receiving the single cells are needed, which may save materials in addition to having compact space. In another embodiment, the separate sealing spaces 113 may be used for receiving the whole single cells having battery cores and electrolytes, which may facilitate the mounting of the single cells.

In some embodiment, there are a plurality of the front and back cover plates 13, 14 for sealing the spaces 112 respectively. As shown in FIGS. 3-4, two adjacent separator plates 111 includes a pair of grooves 114 for accommodating each front cover plate 13, so that each front cover plate 13 may be hermetically connected with the two adjacent separator plates 111. Similarly, each back cover plates 14 may be disposed in the pair of grooves 114 of the two adjacent separator plates 111 respectively, so that each back cover plate 14 may be hermetically connected with the two adjacent separator plates 111 to form the space 112. In other embodiments, the front and back cover plates 13, 14 may be a single plate respectively for sealing the front and back sides of the plurality of separator plates 111.

As shown in FIG. 3, battery cores (not shown) and electrolytes are received in the separate sealing spaces 113 thus formed. Each battery core includes a pair of electrode terminals 118 extended out of the sealing space 113 and connected in series, in parallel, or in series and parallel using flexible metal plates 116, so that the battery cores may be connected in series, in parallel, or in series and parallel. In one embodiment, the electrode terminals 118 are sealed with and insulated from the front cover plate 13.

In one embodiment, the battery module 1 further includes a front panel 15 provided at a front side of the front cover plate 13 to be fixed with the upper cover 12 and the lower shell body 11. And a back panel (not shown) may be provided at the back side of the back cover plate 14 to be fixed with the upper cover 12 and the lower shell body 11, and a pair of openings 151, 152 are provided in the front panel 15 at the lateral sides respectively, for leading out the outmost metal plates 1161, 1162 respectively. As shown in FIG. 3, in one embodiment, six battery cores and electrolytes are received in the six separate sealing spaces 113, six electrode terminals 118 are extended from the six battery cores and connected in series by the metal plates 116, and the outmost metal plates 1161, 1162 pass through the openings 151, 152 in the front panel 15 to be connected with an external load, for example, an electrical device or an electric charger.

In one embodiment, the upper cover 12 and the lower shell body 11 are formed with bolt holes 122, 117 respectively at the edge portions thereof, and the front panel 15 may be formed with bolt holes 153 corresponding to the bolt holes 122, 117 respectively. Therefore, bolts may be used for fixing the front panel 15 with the upper cover 12 and the lower shell body 11. Similarly, the back panel may be fixed with the upper cover 12 and the lower shell body 11 via bolts.

In some embodiment, the front cover plate 13, the back cover plate 14, the upper cover 12, and the lower shell body 11 may be made of materials that are thermally conductive, thus transferring heat between the coolant and the electrolyte effectively. In one embodiment, the upper cover 12 and the lower shell body 11 may be made of a material having certain strength, for example, aluminum alloy. The upper cover 12 and the lower shell body 11 may be formed by metal drawing, and then the channels may be formed in the upper cover 12 and the lower shell body 11 by machining, and finally the front cover plate 13 and the back cover plate 14 may be connected with the lower shell body 11 and the upper cover 12 respectively by welding, for example, soldering or laser welding. The front panel 15 and the back panel may play the role of supporting and sealing, but they may not need to transfer heat, which may be made of plastics such as poly (phenylene oxide) (PPO) by injection molding.

As shown in FIG. 6, the coolant may flow into the battery module 1 from the coolant inlet 125 in the upper cover 12, into the branch flow channels 1111 from the main inlet channel 121, and then into the main outlet channel 1101, and finally out of the battery module 1 from the coolant outlet 115. The separate sealing spaces 113 having battery core and electrolytes are formed between the branch flow channels 1111, and thus the battery cores and electrolytes in the sealing spaces 113 may be cooled or heated uniformly. Therefore, the temperature consistency of members of the battery module 1 may be ensured, and heat may be transferred quickly.

In some embodiment, the main inlet channel 121 and the main outlet channel 1101 have a section area larger than that of the branch flow channels 1111. In one embodiment, the sectional area of the main inlet channel 121 and the main outlet channel 1101 may be about 0.5 times to 2 times as large as the total sectional area of the branch flow channels 1111. As shown in FIG. 6, the section area of the main inlet channel 121 and the main outlet channel 1101 may be 2 times as large as the total sectional area of seven branch flow channels 1111.

In some embodiment, the dimensions of the branch flow channels 1111 are identical with each other, so that the flow of the coolant through the branch flow channels 1111 may be identical and the electrolytes in the sealing spaces 113 may be cooled or heated uniformly. In one embodiment, the width of the branch flow channels 1111 may be no less than 2 mm, thus avoiding the generation of large flowing resistance.

With the battery module according to an embodiment of the present disclosure, the cooling plate 110, the upper cover 12, the front cover plate 13, the back cover plate 14 and the plurality of separator plates 111 are hermetically connected to form a plurality of separate sealing spaces 113 for receiving battery cores and electrolytes therein respectively; and main flow channels 1101, 121 are formed inside the upper cover 12 and the cooling plate 110, and the branch flow channels 1111 are formed inside the separator plates 111 respectively which are in fluid communication with the main flow channels 1101, 121. Therefore, the coolant flowing into the main flow channel 121 may flow into the branch flow channels 1111 respectively and then flow into the main flow channel 1101, thus cooling or heating the battery cores and electrolytes in the plurality of separate sealing spaces 113 effectively and uniformly. Thus, the temperature consistency of the battery module 1 may be ensured.

According to an embodiment of the present disclosure, heat in the coolant in the branch flow channels 1111 may be transferred to the electrolytes through the separator plates 111, so that the contact thermal resistance may be small. Moreover, because the plurality of separator plates 111 are provided to form a plurality of separate sealing spaces 113 for receiving battery cores and electrolytes therein respectively and the branch flow channels 1111 are formed inside the separator plates 111 respectively, the heat transfer contact area may be large, and the heat transfer efficiency may be high, thus ensuring the temperature consistency of the battery module 1. Furthermore, because the coolant in the battery module 1 may be recycled and the flow velocity of the coolant may be adjusted using a battery temperature managing system as described hereinabove, the energy consumption may be reduced, and the noise may be lowered. In addition, because battery cores and electrolytes may be received in the plurality of separate sealing spaces 113 but no housings for the single cells are received in the plurality of separate sealing spaces 113, a housing for receiving the conventional battery module and a housing conventionally used for receiving the single cell may be integrally formed, which may save materials and space in addition to compacted structure thereof.

In some embodiment, the battery temperature managing system may be controlled by the control unit 41 to run in a battery cooling mode, a battery heating mode, or a battery temperature averaging control mode. In the battery cooling mode, when the temperature of the battery module 1 is greater than the first predetermined value, the control unit 41 turns on the circulating pump 221, the electromagnetic valve 34 and the compressor 32, and then the battery module 1 is cooled by the coolant. In the battery heating mode, when the temperature of the battery module 1 is less than a second predetermined value which is less than the first predetermined value, the control unit 41 turns on the circulating pump 221 and the heating device 5, and then the battery module 1 is heated by the coolant. In the battery temperature averaging control mode, when the temperature difference between the first temperature sensor 43 and the second temperature sensor 44 is greater than a third predetermined value, the rotating speed of the circulating pump 221 is controlled by the control unit 41 to control the flow velocity of the coolant, and/or turns on/off the electromagnetic valve 34 to reduce the temperature difference accordingly. The battery cooling mode, the battery temperature averaging control mode, the condensed water avoiding mode and the battery heating mode will be described in detail in the following.

Battery Cooling Mode

When the vehicle is driven by the battery module 1 during large rate discharging, the temperature of the battery module 1 rises continuously. When the temperature of the battery module 1 is greater than the first predetermined value and the control unit (BMS) 41 receives a temperature signal from the temperature sensor 42, as shown in FIG. 2, measuring the temperature of the battery module 1, the control unit 41 turns on the circulating pump 221 to pump the coolant into the coolant circulating circuit 22, the heat in the battery module 1 is transferred to the coolant when the coolant flows through the battery module 1, the heat in the coolant is transferred to the refrigerant when the coolant flows through the heat exchanger 21, and then the coolant flows back into the battery module 1. At the same time, the control unit 41 turns on the compressor 32 and the condenser fan 311 and switches on the electromagnetic valve 34 and the evaporator controller at the same time, the refrigerant flows through the evaporator 33 and the heat exchanger 21. The refrigerant absorbs the heat in the coolant when flowing through the heat exchanger 21, and then flows back into the condenser 31 for heat dissipation. Under the action of the condenser fan 311, the heat in the refrigerant may be dissipated effectively so that the refrigerant may be cooled. If the cabin of the vehicle also needs to be cooled while the battery module 1 needs to be cooled, the control unit 41 may switch on the electromagnetic valve 34 and the evaporator controller and turn on the compressor 32 for cooling the cabin of the vehicle and the battery module 1 simultaneously. If only the battery module 1 needs to be cooled but the cabin of the vehicle does not need to be cooled, the evaporator controller may be switched off.

Battery Temperature Averaging Control Mode

The consistency, especially the temperature consistency, of the single cells is one of the most important performances of the battery module 1. If the temperature difference of the single cells is large, the high-temperature single cell may be aged or failed quickly.

When the temperature difference between the input coolant temperature signal from the first temperature sensor 43 and the output coolant temperature signal from the second temperature sensor 44 is greater than the third predetermined value, the rotating speed of the circulating pump 221 may be controlled by the control unit 41 to control the flow velocity of the coolant, and/or turns on/off the electromagnetic valve 34 to reduce the temperature difference between different single cells respectively.

Condensed Water Avoiding Mode

Condensed water may be generated in the battery module 1 when the temperature difference between the battery module 1 and the coolant is greater, thus affecting the working efficiency and the life span of the battery module 1. To avoid the condensed water, when the temperature difference between the temperature signal from the temperature sensor 42 and the input coolant temperature signal from the first temperature sensor 43 is greater than a fourth predetermined value, the rotating speed of the compressor 32, the rotating speed of the condenser fan 311 and the switching state of the electromagnetic valve 34 are controlled by the control unit 41 to control the temperature of the refrigerant to adjust the temperature of the coolant, and/or controls the heating device 5 to heat the coolant to reduce the temperature difference between the battery module 1 and the coolant.

Battery Heating Mode

When the temperature of the battery module 1 is less than the second predetermined value, after receiving the temperature signal from the temperature sensor 42, the control unit 41 turns on the circulating pump 221 and the heating device 5, and then the battery module 1 is heated by the coolant when the coolant flows through the battery module 1. In another embodiment, if the temperature control device 3 also has heating function and no heating device 5 needs to be provided in the battery temperature managing system, when the temperature of the battery module 1 is less than the second predetermined value, the control unit 41 turns on the circulating pump 221 and the compressor 32, and then the battery module 1 is heated by the coolant when the coolant flows through the battery module 1.

With the battery temperature managing system according to an embodiment of the present disclosure, the coolant rather than the air is used as a medium for cooling or heating the battery module, thus cooling or heating the battery module effectively. Moreover, because the coolant may flow circularly, compared with the air cooling, the battery module may be effectively cooled, and the cooling effect may be better, so that the battery module may always work normally and the temperature consistency of the battery module may be ensured.

Furthermore, the battery temperature managing system according to an embodiment of the present disclosure is mounted in a vehicle having the battery module and the temperature control device, and the temperature control device may be a conventional in-vehicle temperature control device, thus effectively utilizing the space in the vehicle. Moreover, an in-vehicle air conditioner has excellent refrigerating or heating effect, thus effectively enhancing the cooling and/or heating speed of the battery module.

According to an embodiment of the present disclosure, because the control unit may be a battery management system (BMS) for monitoring the temperature of the battery module, only when the temperature of the battery module is greater than the first predetermined value, the temperature control device may be turned on by the control unit, thus effectively saving the energy consumption of the vehicle.

According to an embodiment of the present disclosure, by monitoring the temperature difference between the temperature signal from the temperature sensor for measuring the temperature of the battery module and the input coolant temperature signal from the first temperature sensor, the condensed water inside the battery module caused by the large temperature difference between the battery module and the coolant may be avoided, and the temperature consistency of the battery module and the accurate control on the temperature of the battery module may be ensured, thus prolonging the life span of the battery module effectively.

According to an embodiment of the present disclosure, when the temperature control device has only cooling function, the battery temperature managing system may be further provided with a heating device in the heat exchanger for heating the coolant when the coolant flows through the heating device, so that the battery module may be effectively heated. Thus, the battery module may work normally in an extreme cold environment, and temperature consistency inside the battery module may also be ensured.

According to an embodiment of the present disclosure, a vehicle comprising the abovementioned battery temperature managing system may also be provided.

Although explanatory embodiments have been shown and described, it would be appreciated by those skilled in the art that changes, alternatives, and modifications can be made in the embodiments without departing from spirit and principles of the disclosure. Such changes, alternatives, and modifications all fall into the scope of the claims and their equivalents.

What is claimed is:

1. A battery module comprising:
   a lower shell body having a cooling plate and a plurality of separator plates provided on the cooling plate at spaced intervals;
   an upper cover hermetically connected with tops of the plurality of the separator plates;
   a front cover plate and a back cover plate hermetically connected with front most and backmost sides of the plurality of the separator plates respectively;
   wherein the cooling plate, the upper cover, the front cover plate, the back cover plate, and the plurality of separator plates, are hermetically connected to form a plurality of separate sealing spaces configured to receive battery cores and electrolytes therein respectively; and
   main flow channels disposed within the upper cover and the cooling plate respectively, and branch flow channels disposed within the separator plates respectively, which are in fluid communication with the main flow channels to allow a fluid to flow from the main flow channel disposed within one of the upper cover and the cooling plate, to the branch flow channels, and then to the main flow channel disposed within the other of the upper cover and the cooling plate.

2. The battery module of claim 1, wherein the cooling plate includes a main outlet channel with a coolant outlet formed at an end of the main outlet channel, the upper cover includes a main inlet channel and a coolant inlet at a side of the main inlet channel facing away from the end of the coolant outlet; and each separator plate includes a branch channel connected with the main inlet channel and the main outlet channel.

3. The battery module of claim 1, wherein the cross sectional area of the coolant inlet is smaller than that of coolant outlet by about 10%-20%.

4. The battery module of claim 1, further comprising:
a plurality of battery cores received in the sealing spaces respectively; and
wherein each battery core comprises a pair of electrode terminals extended out of the sealing space which are connected in series, in parallel, or in series and parallel via metal plates.

5. The battery module of claim 4, further comprising:
a front panel provided at a front side of the front cover plate which is fixed with the upper cover and the lower shell body and a back panel provided at a back side of the back cover plate which is fixed with the upper cover and the lower shell body, wherein a pair of electrode lead-out openings are provided on the front panel for leading out the outmost metal plates.

6. The battery module of claim 1, wherein the plurality of the separator plates comprises:
a first outer plate and a second outer plate provided at the outmost lateral sides of the cooling plate; and
at least an intermediate plate between the first and second outer plates, wherein the outer plates have a thickness larger than that of the intermediate plate.

7. The battery module of claim 1, wherein the front cover plate, the back cover plate, the upper cover, and the lower shell body are made of thermal conducting materials.

8. A vehicle comprising a battery temperature managing system, the battery temperature managing system comprising:
the battery module according to claim 1;
a heat exchanger connected with the battery module by a coolant circulating circuit; and
a temperature control device connected with the heat exchanger by a refrigerant circulating circuit, wherein a coolant in the coolant circulating circuit and a refrigerant in the refrigerant circulating circuit exchange heat with each other through the heat exchanger, and wherein the battery module is cooled or heated by the coolant when the coolant flows through the battery module.

* * * * *